(12) United States Patent
Göhrle et al.

(10) Patent No.: US 9,950,585 B2
(45) Date of Patent: Apr. 24, 2018

(54) METHOD FOR PROVIDING A MANIPULATED VARIABLE

(71) Applicant: AUDI AG, Ingolstadt (DE)

(72) Inventors: Christoph Göhrle, Ingolstadt (DE);
Andreas Schindler, Ingolstadt (DE);
Andreas Unger, Gaimersheim (DE);
Oliver Sawodny, Stuttgart (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/036,294

(22) PCT Filed: Nov. 7, 2014

(86) PCT No.: PCT/EP2014/002981
§ 371 (c)(1),
(2) Date: May 12, 2016

(87) PCT Pub. No.: WO2015/070961
PCT Pub. Date: May 21, 2015

(65) Prior Publication Data
US 2016/0288608 A1  Oct. 6, 2016

(30) Foreign Application Priority Data
Nov. 13, 2013 (DE) .................. 10 2013 018 927

(51) Int. Cl.
*B60G 17/018* (2006.01)
*B60G 23/00* (2006.01)
(Continued)

(52) U.S. Cl.
CPC ....... *B60G 17/0165* (2013.01); *B60G 17/018* (2013.01); *B60G 2400/102* (2013.01);
(Continued)

(58) Field of Classification Search
CPC ................. B60G 17/01; B60G 17/65
See application file for complete search history.

(56) References Cited

U.S. PATENT DOCUMENTS 8,762,000 B2   6/2014  Schindler et al.
9,108,482 B2   8/2015  Mohrlock et al.
(Continued)

FOREIGN PATENT DOCUMENTS

CN   1636776   7/2005
CN   101263018  9/2008
(Continued)

OTHER PUBLICATIONS

M.D. Donahue et al.: Implementation of an Active Suspension, Preview Controller for Improved Ride Comfort"in: Nonlinear and Hybrid Systems in Automotive Control", pp. 1-22; Jan. 1, 2003.
(Continued)

*Primary Examiner* — Imran Mustafa
(74) *Attorney, Agent, or Firm* — Henry M. Feiereisen LLC

(57) ABSTRACT

The invention relates to a method for providing a manipulated variable for an actuator (4) of an active chassis of a motor vehicle (2), wherein the manipulated variable in the event that a value for a projected variable, which is dependent upon a height profile of the terrain to be travelled by the motor vehicle (2), is available, is configured from a combination of a Skyhook variable, which is dependent upon a movement of a structure of the motor vehicle (2), and the projected variable, and wherein the manipulated variable is configured from a combination of a soft-spring variable, which is dependent upon a wheel-suspension of the motor vehicle (2), and the Skyhook variable, if no value for the projected variable is available.

7 Claims, 3 Drawing Sheets

(51) Int. Cl.
  *B62C 3/00* (2006.01)
  *B62K 25/00* (2006.01)
  *G06F 7/00* (2006.01)
  *G06F 17/00* (2006.01)
  *G06F 19/00* (2018.01)
  *B60G 17/0165* (2006.01)

(52) U.S. Cl.
  CPC .... *B60G 2400/202* (2013.01); *B60G 2400/82* (2013.01); *B60G 2400/821* (2013.01); *B60G 2401/14* (2013.01); *B60G 2401/174* (2013.01); *B60G 2401/176* (2013.01); *B60G 2401/21* (2013.01); *B60G 2500/10* (2013.01); *B60G 2800/70* (2013.01); *B60G 2800/80* (2013.01); *B60G 2800/85* (2013.01)

(56) References Cited

U.S. PATENT DOCUMENTS

| | | |
|---|---|---|
| 9,205,874 B2 | 12/2015 | Schindler et al. |
| 9,321,323 B2 | 4/2016 | Schindler et al. |
| 2005/0178628 A1 | 8/2005 | Uchino et al. |
| 2009/0062984 A1 | 3/2009 | Poilbout |
| 2010/0049394 A1* | 2/2010 | Ammon ............. B60G 17/0165 701/31.4 |
| 2013/0099455 A1 | 4/2013 | Beringer et al. |
| 2014/0195112 A1* | 7/2014 | Lu ........................ B60G 17/015 701/37 |

FOREIGN PATENT DOCUMENTS

| | | |
|---|---|---|
| CN | 101835644 | 9/2010 |
| DE | 39 28 993 A1 | 1/1991 |
| DE | 10 2008 032 545 | 1/2010 |
| JP | 2008224459 A * | 9/2008 |

OTHER PUBLICATIONS

International Search Report issued by the European Patent Office in International Application PCT/EP2014/002981 dated Jan. 16, 2015.

Chinese Search Report dated Mar. 30, 2017 with respect to counterpart Chinese patent application 201480061990.8.

Translation of Chinese Search Report dated Mar. 30, 2017 with respect to counterpart Chinesepatent application 201480061990.8.

\* cited by examiner

METHOD FOR PROVIDING A MANIPULATED VARIABLE

CROSS-REFERENCES TO RELATED APPLICATIONS

This application is the U.S. National Stage of International Application No. PCT/EP2014/002981, filed Nov. 7, 2014, which designated the United States and has been published as International Publication No. WO 2015/070961 and which claims the priority of German Patent Application, Serial No. 10 2013 018 927.6, filed Nov. 13, 2013, pursuant to 35 U.S.C. 119(a)-(d).

BACKGROUND OF THE INVENTION

The invention relates to a method and a system for providing a manipulated variable for an actuator of a chassis of a motor vehicle.

A motor vehicle includes various sensors for detecting operating parameters of the motor vehicle, and different actuators for acting upon components of the motor vehicle. A manipulated variable for acting upon a component via an actuator is derived hereby from at least one value of a sensor.

Document DE 10 2006 039 353 A1 discloses a method for influencing a wheel spring device in which the spring characteristic can be changed through activation of an actuating device. A sensor device is hereby used for determining a height profile of a roadway ahead, and a control device to adapt the spring device to the anticipated course of the sensor-detected height profile.

SUMMARY OF THE INVENTION

Against this background, a method and a system are provided with the features of the independent claims. Further configurations of the invention will become apparent from the dependent claims and the description.

The invention relates to a method for providing a manipulated variable for an actuator of an active chassis of a motor vehicle. In the event a value for an anticipated variable, which is dependent on a height profile of a ground to be traveled by the motor vehicle, is available, the manipulated variable to be provided is formed from a combination of a skyhook variable, which is dependent on a movement of a body of the motor vehicle, and the anticipated variable. In the absence of a value for the anticipated variable, the manipulated variable is formed from a combination of a soft-spring variable, which is dependent on a wheel jounce of the motor vehicle, and the skyhook variable.

The provided variables, i.e. the anticipated variable, the skyhook variable, and the soft-spring variable are manipulated variables for the actuator, which are supplied to the actuator via control signals, so that, e.g., its target force, target torque, or target position is being set, with the manipulated variables being controlled by a subordinate actuator control. Depending on the type of actuator and software interface, the manipulated variables for control may vary. This results in all types of actuators in a force which becomes effective between the body and a respective wheel of the motor vehicle, thus influencing the movement behavior of the vehicle in the vertical direction. The anticipated variable is a manipulated variable, which is calculated based on unevenness of the ground. The skyhook variable is a manipulated variable, which is calculated from a movement of the body, normally from the absolute, vertical speed as well as the pitch and roll rates of the body. The soft-spring variable is a manipulated variable, which is calculated from the relative movement between the body and wheel, i.e. a jounce.

In the context of the method, at least one sensor for detecting an environment of the motor vehicle determines the height profile of the ground to be traveled. The anticipated variable is derived from the determined height profile of the ground. Based on values of the height profile, the manipulated variable, provided for the actuator, is determined, with the actuator responding to a condition of the ground, which may have, i.a. uneven surfaces, so that a wheel of the motor vehicle, acted upon directly or indirectly by the actuator of the chassis, is able to react to an unevenness and evade it.

In addition, at least one sensor is used for detecting a kinematic variable of at least one component of the motor vehicle, with this sensor determining a movement of the at least one component. This at least one sensor for detecting the kinematic variable determines a movement of the body as at least one component of the motor vehicle. The skyhook variable is derived from the movement of the body.

As an alternative, or in addition, the at least one sensor for detecting a movement of a kinematic variable determines a movement of a suspension or spring, associated to a wheel of the motor vehicle, as at least one component of the motor vehicle. The soft-spring variable is derived from the movement of a wheel jounce of the wheel or the suspension for the wheel and/or a relative movement between body and wheel.

The system according to the invention is configured to provide a manipulated variable for an actuator of an active chassis of a motor vehicle and includes a control unit for determining the manipulated variable, a module for implementation of an anticipated function, a module for implementation of a skyhook function, and a module for implementation of a soft-spring function. The module for implementation of the anticipated function is hereby configured to provide an anticipated variable, which is dependent on a height profile of a ground to be traveled by the motor vehicle. The module for implementation of the skyhook function is configured to provide a skyhook variable, which is dependent on a movement of a body of the motor vehicle. The module for implementation of the soft-spring function is configured to provide a soft-spring variable, which is dependent on a wheel jounce of the motor vehicle. The control unit is configured to form, in the event that a value for an anticipated variable is provided, the manipulated variable from a combination of the skyhook variable and the anticipated variable. As an alternative, the control unit is configured to form the manipulated variable from a combination of the soft-spring variable and the skyhook variable in the absence of a value for the anticipated variable.

The system further includes at least one sensor for detecting an environment of the motor vehicle, which is configured to determine the height profile of the ground to be traveled and to transmit it to the module for implementation of the anticipated function. The module for implementation of the anticipated function is configured to derive the anticipated variable from the height profile.

Furthermore, the system includes at least one sensor configured to ascertain a value for at least one kinematic variable of a component of the motor vehicle and to transmit is to both the module for implementation of the skyhook function and the module for implementation of the soft-spring function. The module for implementation of the skyhook function is hereby configured to derive the skyhook variable from the value for the at least one kinematic variable. The module for implementation of the soft-spring function is configured to derive the soft-spring variable from the value for the at least one kinematic variable, The module for implementation of the anticipated function is configured to deactivate the module for implementation of the soft-spring function in the presence of the value for the anticipated variable.

To control an electronically active dynamic height adjustment for an active and/or actively adjustable chassis of a motor vehicle, an embodiment of the method involves implementation of two functions or measures individually or in combination.

According to a first function, designated as "soft spring", actuators of the chassis respond to spring travels of springs of the chassis, with such a spring being arranged between the body and a wheel of the motor vehicle and mechanically connecting the wheel to the body. Unevenness of the ground being traveled or a roadway being traveled is hereby actively compensated, comparable to a reduction of a spring rate of the springs. The soft-spring function is provided to determine the soft-spring variable which is dependent on the movement of the wheel jounce.

A second function is referred to as "skyhook". This skyhook function is based on a targeted attenuation of the body of a motor vehicle. The motor vehicle includes as components the body, the chassis, and the wheels, with the chassis connecting the body and the wheels. Springs, dampers and actuators are components of the chassis. To implement the skyhook function, an acceleration of the body is determined, integrated and filtered over time. Hereby, e.g. a speed of the body is calculated and a force, which is proportional to the speed of the body, is provided as the actuators are acted upon with the skyhook function. An action resulting from this second function is comparable to a virtual damper which is connected with the body of the motor vehicle and an inertial reference system, e.g. the sky, and therefore the function is referred to as "skyhook", since the body of the motor vehicle is quasi connected via a damper to the sky, so that the motor vehicle appears to float, when traveling on a roadway. The skyhook variable, which is dependent, e.g. on a movement and/or control of the body, is derived from the skyhook function.

By combining these two functions, both a soft jouncing and a "floating above the roadway" can be achieved.

When implementing the method in the event no signals for the anticipated variable (preview variable), dependent on the height profile of the ground, are present for control of the electronically active dynamic height adjustment for the chassis of the motor vehicle, the functions "soft spring" and "skyhook" are activated in combination. In this case, a manipulated variable u is established for an actuator, e.g. by adding the two function-specific variables $u_{soft\ spring}$ and $u_{skyhook}$ with u32 $u_{soft\ spring}$+$u_{skyhook}$.

However, when a value for the anticipated variable is available, the soft-spring variable $u_{soft\ spring}$ is adjusted in the form of a hitherto used constant value, and thus the soft-spring variable $u_{soft\ spring}$ is frozen, whereby the constant value can be 0. It is also possible to initially provide for the soft-spring variable a constant value other than 0, which then slowly and gradually approaches the value 0, and thus is "ramped". Moreover, the manipulated variable u for activating the actuators of the chassis may involve a sum of the skyhook variable $u_{skyhook}$ and the anticipated variable $u_{anticipated}$, which is dependent on at least one sensor-detected value of a variable for describing a ground to be traveled by the motor vehicle. The manipulated variable is governed by $u=u_{anticipated}+u_{skyhook}+u_{soft\ spring}$, with the soft-spring variable being a constant value.

When an additional value for the anticipated variable $u_{anticipated}$, becomes available from the anticipation, this additional value is not simply added to the soft-spring variable $u_{soft\ spring}$, since the actuators cause the wheels to proactively evade uneven surfaces of the roadway, which can be recognized beforehand on the basis of the height profile so that spring travels are influenced. The soft-spring function causes e.g a reaction through control of a spring travel upon a ground to be traveled and an additional reinforcement of the suspension of the chassis, even though the suspension is adjusted because of the anticipation and not as a result of uneven surfaces. When executing the method, it is possible i.a. through alternating use of the anticipated variable and the soft-spring variable to prevent the presence of an implausible control of the chassis.

Further advantages and configurations of the invention will be apparent from the description and the accompanying drawings.

It is understood that the features mentioned above and those yet to be explained can be used not only in the particular combination indicated but also in other combinations or alone, without departing from the scope of the present invention.

BRIEF DESCRIPTION OF THE DRAWING

The invention is schematically illustrated by way of embodiments in the drawings and will be described schematically and in detail with reference to the drawings.

DETAILED DESCRIPTION OF PREFERRED EMBODIMENTS

Figure 1:
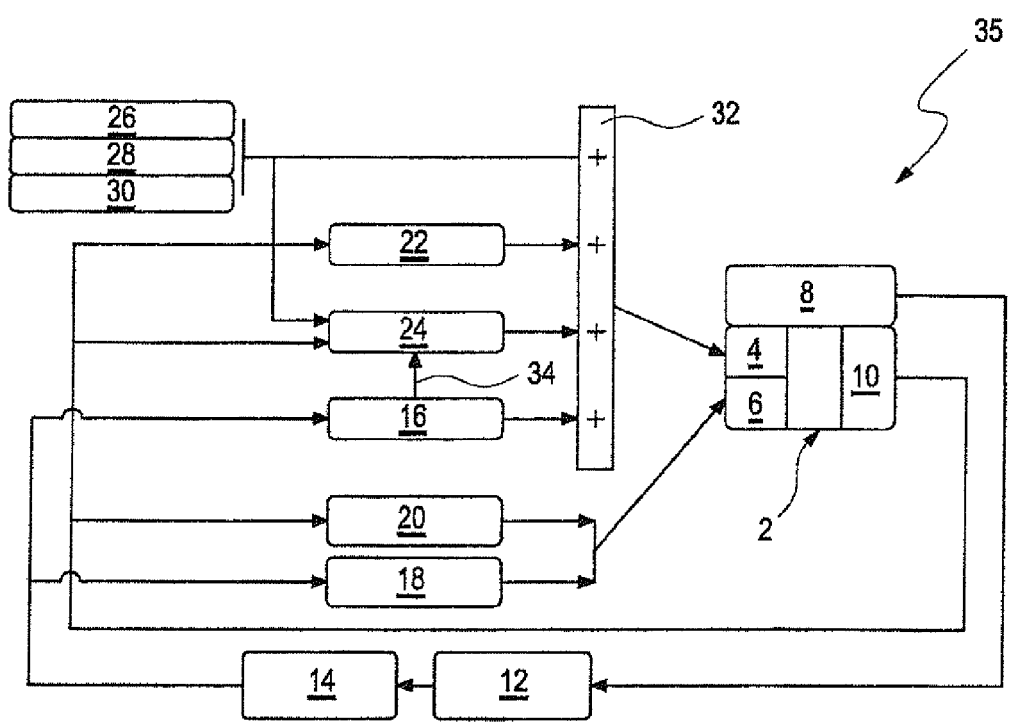
FIG. 1 shows an embodiment of a system according to the invention, when executing a first embodiment of a method according to the invention.

The diagram in FIG. 1 shows a schematic illustration of a vehicle 2 with a chassis, with at least one actuator 4 and at least one damper 6 being associated to this chassis of the motor vehicle 2. At least a first sensor 8 is additionally associated to the motor vehicle 2 and configured for detecting the surroundings or environment or of the motor vehicle 2 on the basis of electromagnetic waves, and thus is laser-based, radar-based and/or video-based. Further, at least a second sensor 10 is associated to the motor vehicle 2 and configured to determine at least one kinematic variable of a component of the motor vehicle 2, for example, its position, its speed, its acceleration, its roll rate, its pitch rate and/or its stroke acceleration. These sensors 8, 10, the modules 12, 14, 16, 18, 20, 22, 24, 26, 28, 30 to be subsequently introduced, and a control unit 32 are embodied here as components of the system 35 according to the invention.

When the system 35 executes the first embodiment of the method, the at least one first sensor 8 for detecting the surroundings of the motor vehicle 2 provides values, and thus raw data for a height profile of a ground, usually a roadway, which is to be traveled by the motor vehicle 2. These provided values are accumulated by a module 12 for executing an accumulation and thus summarized. The thus accumulated values are filtered by a module 14 for processing. In addition, the module 14 executes for the accumulated and filtered values for describing the height profile of the ground i.a. an unevenness detection. A course of the height profile is hereby examined for the presence of unevenness. The height profile includes hereby at one location an unevenness, when a value for the height at this location exceeds a limit value and/or when at this location, a value of a local derivation and therefore a gradient of the height profile exceeds a limit value.

The accumulated and processed values for the height profile are further provided to both a module 16 for realization of an anticipated function and a module 18 for adjusting a damper 6 in the presence of an unevenness, with the at least one damper 6 being adjusted soft. The at least one second sensor 10 for determining the at least one kinematic variable of the motor vehicle 2 provides values for a stroke acceleration or vertical acceleration $d^2z_a/dt^2$ as kinematic variable of at least one component of the motor vehicle 2, a change in inclination or pitch rate $dn/dt$ as kinematic variable of at least one component of the motor vehicle 2, a roll rate $dw/dt$ as kinematic variable of at least one component of the motor vehicle, and a vertically oriented wheel jounce $I_z,ij$ of least one component, here a suspension of a wheel of the motor vehicle 2. The parameters ij relate hereby to each wheel j associated to an axle i of the motor vehicle 2.

All of these mentioned kinematic variables, which are detected by the at least one second sensor 10, are provided to a module 20 for adjusting at least one damper 6 and for realization of a so-called groundhook function. Conversely, a module 22 for providing the skyhook function receives only values for the vertical acceleration, the pitch rate, and the roll rate. A module 24 for implementation of a soft-spring function receives in the present embodiment only a value of the wheel jounce $I_z,ij$ from the least one sensor 10 for detecting the at least one kinematic variable.

Analogous to the skyhook function, the groundhook function involves a connection of the wheel (groundhook), instead of body (skyhook), of the motor vehicle via a virtual damper with an inertial reference system. A force is calculated which is proportional to a speed of the wheel which speed is normally oriented in the vertical direction. The manipulated variable to be provided for the at least one actuator is predefined with consideration of this force. Thus, vibrations of the wheel are attenuated, resulting in an improvement of roadway contact.

Moreover, FIG. 1 shows a module 26 for realization of a pitch pre-control, a module 28 for realizing a roll pre-control, and a module 30 for controlling a level of the motor vehicle 2. These latter three modules 26, 28, 30 provide values for at least one reference variable, with such values being transmitted to the module 24 for realizing the soft-spring function and further to a control unit 32.

This control unit 32 further receives values from the module 24 for the soft-spring function and the module 16 for the anticipated function. All values provided to the control unit 32 are used to determine at least one manipulated variable for application to the at least one actuator 4. Conversely, values that are provided by the modules 18, 20 are used to provide at least one manipulated variable for application to the at least one damper 6 of the motor vehicle 2.

A variant is provided for the embodiment of the method according to the invention, as executed by the system 35, which variant involves the absence of values for the height profile under the wheels of the motor vehicle 2. In this case, the module 16 for the implementation of the anticipated function does not receive values provided as initial values. The control unit 32 uses hereby only values that are provided by the modules 22, 24, 26, 28, 30. In the presence of values for the height profile, provision is, however, made for a deactivation of the module 24 for realization of the soft-spring function by the module 16 for realization of the anticipated function, as indicated by an arrow 34. In this case, the control unit 32 uses values from the modules 16, 22, 26, 28, 30.

Figure 2:
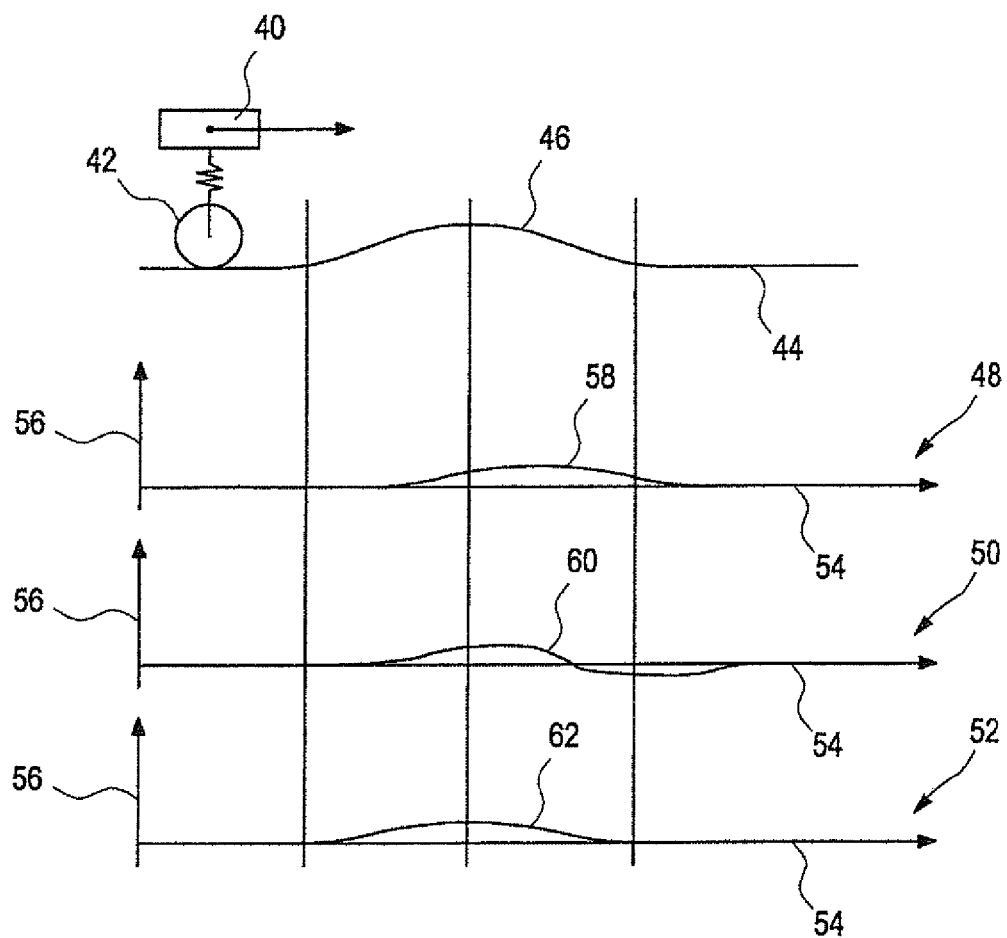
FIG. 2 shows diagrams of a second embodiment of the method according to the invention.

FIG. 2 shows a schematic illustration of a body 40 of a motor vehicle and a wheel 42 of this motor vehicle during travel on a ground 44 which has an unevenness 46. Furthermore, FIG. 2 depicts three diagrams 48, 50, 52 arranged below one another, each having an abscissa 54 along which the time is plotted. In addition, each of the diagrams 48, 50, 52 has an ordinate 56 along which values for a variable are plotted. A first diagram 48 shows a course 58 of a soft-spring variable during travel of the motor vehicle. A second diagram 50 shows a course 60 for a skyhook variable during travel of the motor vehicle. A third diagram 56 shows a course 62 of an anticipated variable.

The diagrams make it apparent that the soft-spring variable (course 58) and the skyhook variable (course 60) become effective only after the beginning of the unevenness 46 has been passed. The course 62 of the anticipated variable corresponds here to the course 58 of the soft-spring variable, but acts already at the beginning of the unevenness 46. While at least one actuator of the motor vehicle merely reacts to a combination of the soft-spring variable and skyhook variable, the combination of the anticipated variable and the skyhook variable realizes a proactive control of the at least one actuator. Since the courses 58, 62 of the soft-spring variable and the anticipated variable are similar in principle, substitution of the soft-spring variable by the anticipated variable is admissible. The skyhook variable, however, is independent of the other two variables.

Figure 3A:
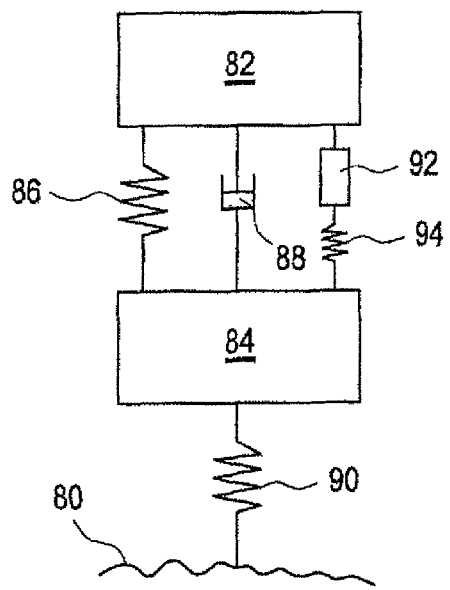
FIG. 3 shows a schematic illustration of a chassis of a motor vehicle with consideration of different measures with respect to a third embodiment of the method according to the invention.
Figure 3B:
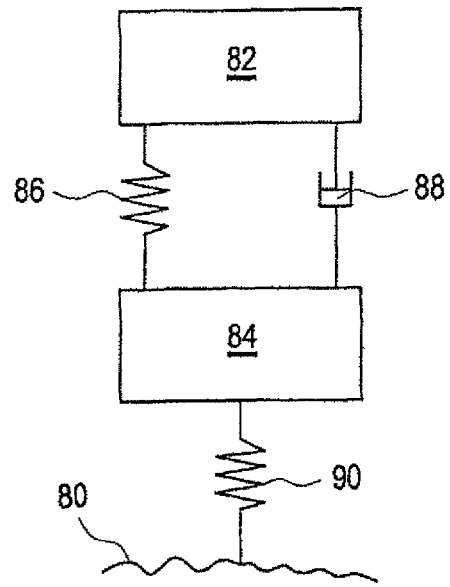
Figure 3C:
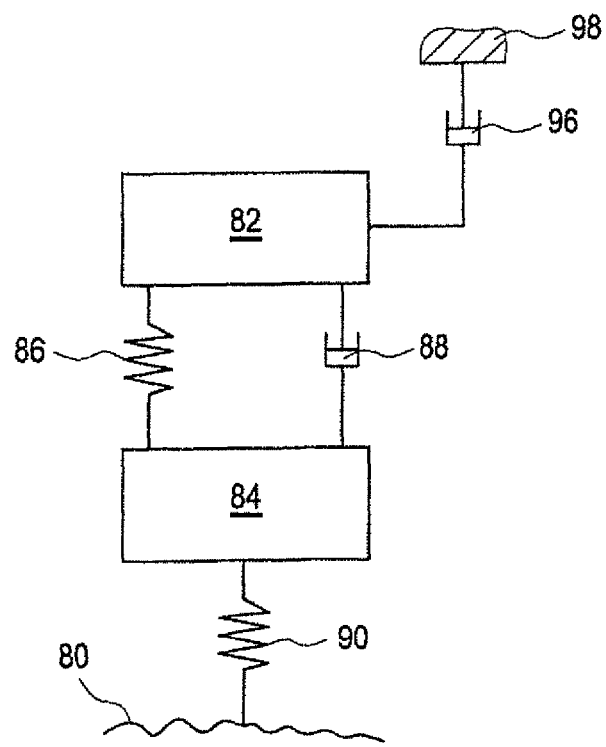

FIGS. 3a, 3b and 3c depict different models for measures or functions for control, typically for regulation, of actuators of a motor vehicle, which moves on a ground 80. Schematically illustrated for each of these measures is a mass 82 for a body of the motor vehicle, a mass 84 for a wheel of the motor vehicle as well as a spring 86 of the body and a damper 88 of the body, which are arranged between the two masses 82, 84. Moreover, FIGS. 3a, 3b and 3c show for each of the three measures a tire spring 90, arranged between the wheel with the mass 84 and the ground 80.

In order to implement a function for a real system, FIG. 3a additionally shows an actuator 92 and a torsion bar spring 94, which are arranged in series between the two masses 82, 84 and parallel to the spring 86 of the body and the damper 88 of the body. Based on a soft-spring function, as reflected in FIG. 3b, it is provided that a spring constant of the spring 86 of the body, which spring is arranged here only parallel to the damper 88 of the body, is considerably less than in the spring 86 of the body for implementing the function for the real system (FIG. 3a) so that the spring 86 of the body is adjusted substantially softer when compared to the function for the real system. Based on an implementation of a skyhook function, as reflected in FIG. 3c, it is provided that the spring 86 of the body is adjusted similarly hard as in the case of the real system, in the present embodiment harder than in the case for the realization of the soft-spring function. FIG. 3c further shows that the body of the motor vehicle is connected with the mass 82 via a virtual damper 96 with an inertial reference system 98.

The models shown in FIGS. 3b and 3c are idealized and can be realized by the actually existing model of FIG. 3a.

For this purpose, the actuator 92 is activated such that the same forces are adjusted in the chassis between the body with the mass 82 and the wheel with the mass 84, as would be established in the models. The combination of soft-spring function (FIG. 3b) and the skyhook function (FIG. 3c) is symbolized here by a model that is structured as shown in FIG. 3c, however, has the softer spring stiffness of the spring of the model in FIG. 3b. When using the anticipated function, instead of the soft-spring function, the harder spring stiffness of the models of FIGS. 3a and 3c becomes again effective in the alternative model, however instead a component is added that is derived directly from the profile of the ground 80.

The invention claimed is:

1. A method for providing a manipulated variable for an actuator of an active chassis of a motor vehicle, comprising: forming the manipulated variable in one of two ways,
    a first way using an anticipated function implemented by a first module in which the manipulated variable is formed from a combination of a skyhook variable provided by a second module, which is dependent on a movement of a body of the motor vehicle, and an anticipated variable, which is dependent on a height profile of a ground to be traveled by the motor vehicle, when a value for the anticipated variable is available,
    a second way using a soft-spring function implemented by a third module in which the manipulated variable is formed from a combination of a soft-spring variable, which is dependent on a wheel jounce of the motor vehicle, and the skyhook variable, when no value is available for the anticipated variable, said third module being deactivated when the value for the anticipated variable is available; and
    using at least one sensor for detecting an environment of the motor vehicle to determine the height profile of the ground to be traveled, and deriving the anticipated variable from the height profile, said height profile being determined by calculating a force proportional to a speed of motor vehicle wheels oriented in a vertical direction by a virtual damper with an inertial reference system.

2. The method of claim 1, further comprising using at least one sensor for detecting a kinematic variable of at least one component of the motor vehicle to derive a movement of the at least one component.

3. The method of claim 2, wherein the at least one sensor for detecting a kinematic variable is used to derive a movement of the body as the at least one component of the motor vehicle, and further comprising deriving the skyhook variable from the movement of the body.

4. The method of claim 2, wherein the at least one sensor for detecting a kinematic variable is used to derive a movement of a suspension, associated to a wheel of the motor vehicle, as the at least one component of the motor vehicle, and further comprising deriving the soft-spring variable from a wheel jounce of the wheel.

5. The method of claim 1, wherein in the presence of the value for the anticipated variable, using a constant value for the soft-spring variable, with the manipulated variable being formed from a combination of the constant soft-spring variable, the skyhook variable, and the anticipated variable.

6. A system for providing a manipulated variable for an actuator of an active chassis of a motor vehicle, said system comprising:
    a first module implementing of an anticipated function, said first module being configured to provide an anticipated variable, which is dependent on a height profile of a ground to be traveled by the motor vehicle;
    a second module implementing of a skyhook function, said second module being configured to provide a skyhook variable, which is dependent on a movement of a body of the motor vehicle;
    a third module implementing of a soft-spring function, said third module being configured to provide a soft-spring variable, which is dependent on a wheel jounce of the motor vehicle, said third module being deactivated when a value for the anticipated variable is available;
    a control unit configured to determine the manipulated variable, said control unit being configured to form the manipulated variable in one of two ways, a first way in which the manipulated variable is formed from a combination of the skyhook variable and the anticipated variable, when the value for the anticipated variable is available, a second way in which the manipulated variable is formed form the manipulated variable from a combination of the soft-spring variable and the skyhook variable, when no value is available for the anticipated variable; and
    at least one sensor for detecting an environment of the motor vehicle, said at least one sensor being configured to determine the height profile of the ground to be traveled and to transmit the determined height profile to the first module, said first module being configured to derive the anticipated variable from the height profile, said height profile being determined by calculating a force proportional to a speed of motor vehicle wheels oriented in a vertical direction by a virtual damper with an inertial reference system.

7. The system of claim 6, further comprising at least one sensor configured to detect a value for at least one kinematic variable of a component of the motor vehicle and to transmit the value to the second and third modules, said second module being configured to derive the skyhook variable from the value for the at least one kinematic variable, said third module being configured to derive the soft-spring variable from the value of the at least one kinematic variable.

* * * * *